United States Patent [19]

Turner et al.

[11] Patent Number: 4,553,464
[45] Date of Patent: Nov. 19, 1985

[54] SIZE TRIMMER

[75] Inventors: Edward W. Turner, Deerfield; Peter J. Blake, Bondsville; Joseph C. Strzegowski, Jr., Conway, all of Mass.

[73] Assignee: Hardigg Industries, Inc., South Deerfield, Mass.

[21] Appl. No.: 562,519

[22] Filed: Dec. 19, 1983

Related U.S. Application Data

[63] Continuation of Ser. No. 247,555, Mar. 25, 1981, abandoned.

[51] Int. Cl.$^4$ .............................................. B26D 3/00
[52] U.S. Cl. .......................................... 83/865; 83/49; 83/188; 83/519; 83/614; 83/622; 83/914
[58] Field of Search ...................... 83/49, 54, 862–865, 83/188, 192–194, 513, 519, 614, 620, 622, 914; 30/2; 414/412

[56] References Cited

U.S. PATENT DOCUMENTS

| | | | |
|---|---|---|---|
| 2,074,547 | 3/1937 | Hessenbruch | 83/183 X |
| 3,763,557 | 10/1973 | Sewell | 30/2 |
| 3,913,435 | 10/1975 | Stahl | 83/193 |
| 4,411,183 | 10/1983 | Auer | 83/54 X |

Primary Examiner—James M. Meister
Attorney, Agent, or Firm—Cushman, Darby & Cushman

[57] ABSTRACT

Trimming apparatus for cutting the side walls of containers to predetermined, dimensional requirements so that such containers will be properly sized for subsequent usage. The apparatus is comprised of support means for holding an uncut container and an adjustable cutter assembly adapted to move along the support means and cut the wall of the container along desired lines in a synchronized manner. Each of the cutters include at least two knives that track on the same cut line with the leading knife cutting only partially through the side wall of the container while the following knife completes the cut. The apparatus also includes loading means for loading uncut containers and means for removing the cut portions.

17 Claims, 9 Drawing Figures

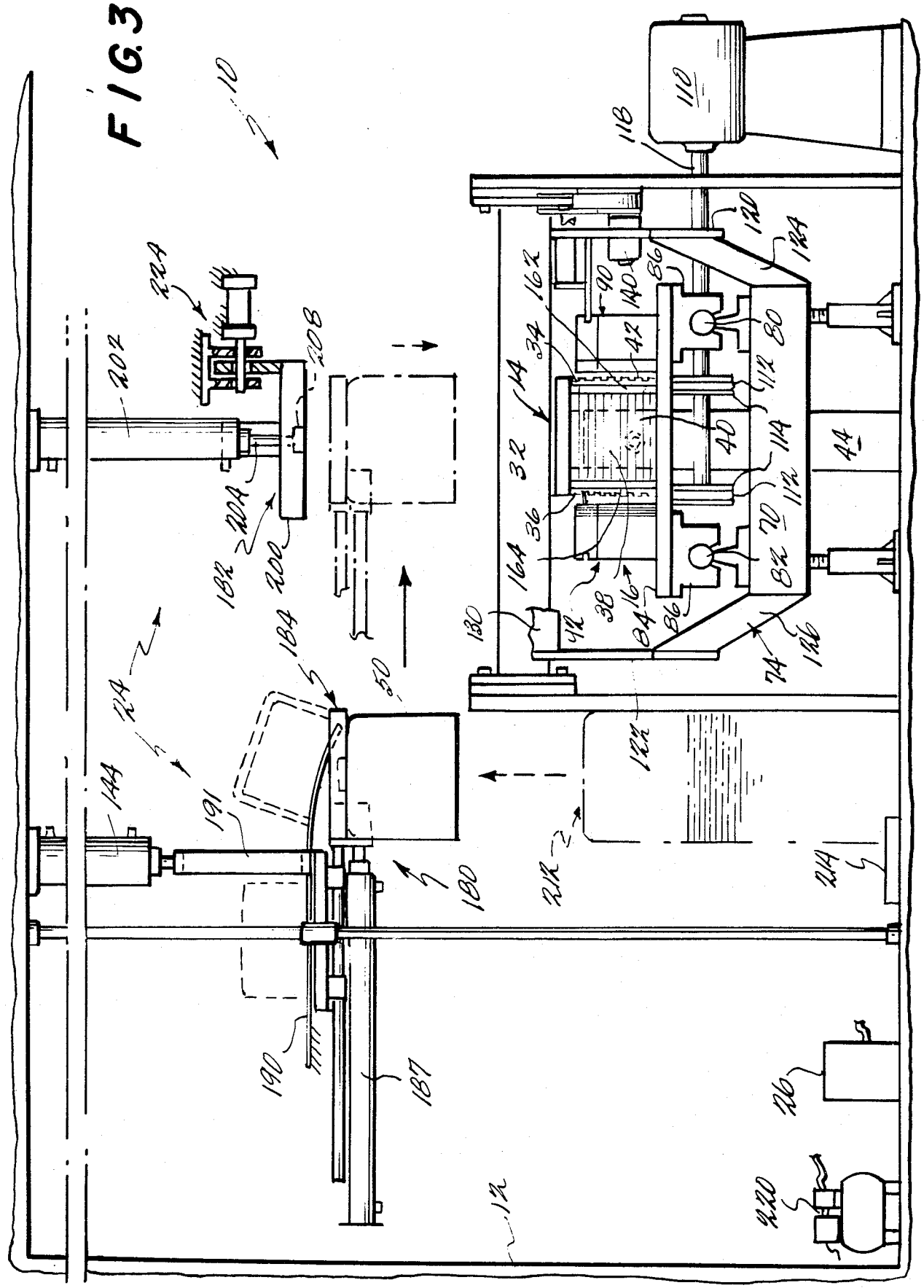

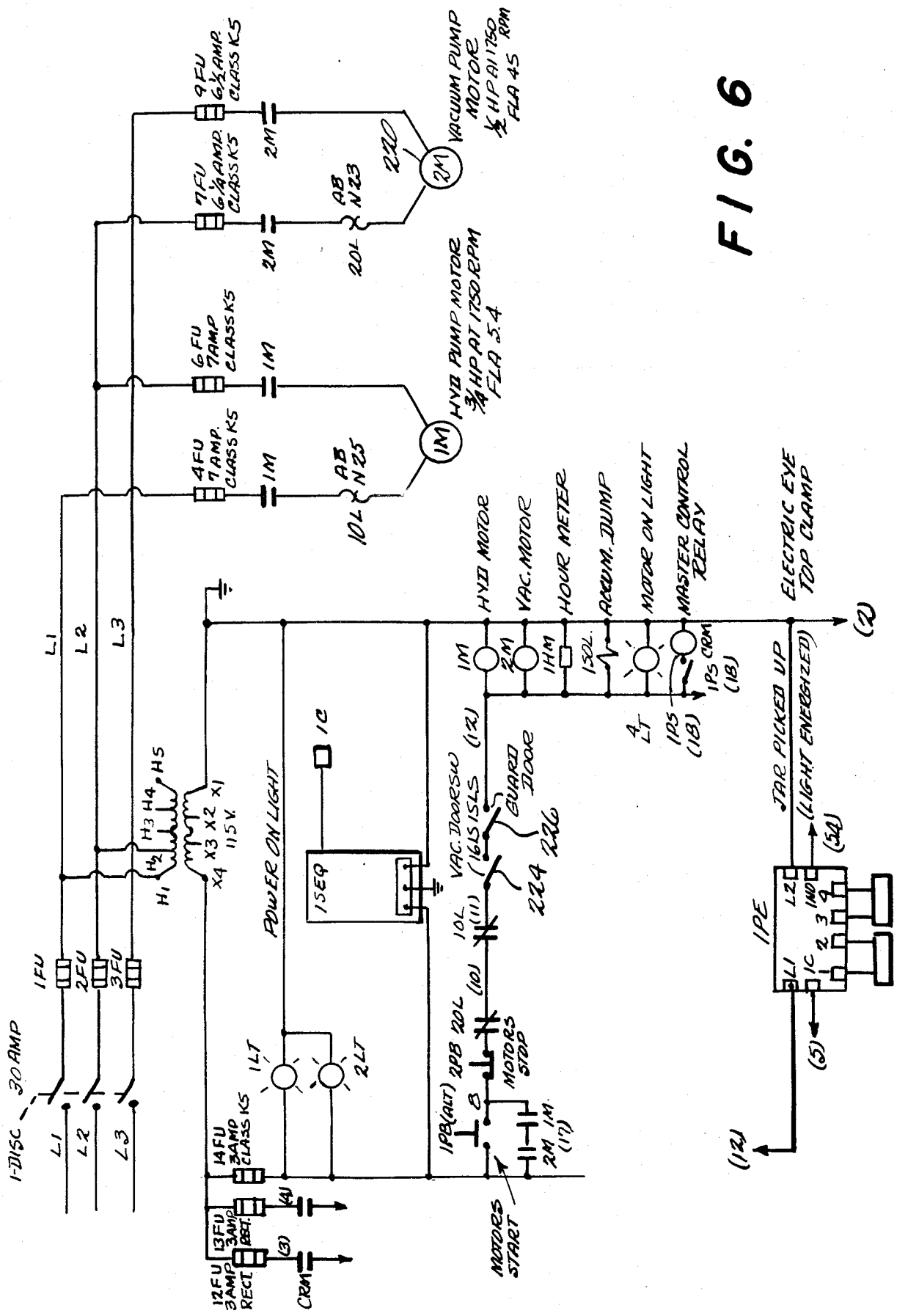

SIZE TRIMMER

This is a continuation of application Ser. No. 247,555, filed Mar. 25, 1981, now abandoned.

BACKGROUND OF THE PRESENT INVENTION

The apparatus which comprises the present invention is primarily designed for use with plastic containers, such as those molded by injection molding procedures from polypropylene. While a variety of container types could be formed, this invention is primarily concerned with sizing halfjar molded blanks two of which will be subsequently welded together to form a completed jar or container. Battery jars can be formed in this manner, and in their construction, it is important that the battery jar be sized to hold exactly the number of plates desired for the cell and since the number of plates will vary from cell size to cell size, it is easier to mold half jar blanks with a longer side wall than is necessary for the greatest dimension needed and to thereafter trim each blank to the desired size.

While the present invention will deal primarily with the construction of battery jars and the trimming of blanks therefor, it should be understood that this apparatus can be used to trim a variety of containers to finished dimensions. In addition, it should also be understood that such containers can be made out of a variety of materials, the only necessity being that the container be constructed from a material that is severable by slicing techniques.

It is known, in the battery art, that battery jar blanks can be trimmed following molding through the use of saw type cutters. The problem with such procedures, however, is that the resulting finished edge can very likely be jagged or rough which does not lend itself to being welded to a similar edge. Also, a great deal of waste material, in the form of dust and chips, is created and the atmosphere around such sawing devices becomes contaminated with that dust. Additionally, the sawing operation creates a good deal of noise which increases the overall noise level within a plant environment. Together, these problems make working conditions somewhat less desirable than they might otherwise be without the use of saw type cutters.

Because many chips are being produced by such saw blades, it is also sometimes necessary to clean or otherwise treat the cut edge of the blank prior to welding which adds additional labor costs to the manufacturing process. Further, as saw blades become dull with use, it is difficult to maintain the accuracy of cuts and the process is also energy inefficient because of the power required not only to make the cut but the thousands of chips produced thereby.

SUMMARY OF THE PRESENT INVENTION

The apparatus produced according to the present invention makes it possible to cut or trim molded halves of battery jars or blanks to their proper dimensions through the use of knives or razor blades quietly, economically and relatively noiselessly. The apparatus produces extremely straight cuts, and eliminates jagged edges along the cut line, and the cutting stroke is quiet and more energy efficient since there is no cutting away of the container side wall in the same manner in which a saw blade would make its cut. Further, the cutting stroke does not create dust in the plant's atmosphere and does not result in the formation of waste in the form of cut chips as with saw blades.

The apparatus employs a unique cutter design in which a block has two machined slots, each for receiving a cutting blade therein, preferably a segmented cutting blade. The blades, after being placed in the such slots, are held fixed in place by a cover plate. Each blade lies in the same horizontal plane and it is preferred to employ two cutting blades or knives. The first blade extends away from its mounting block on the side adjacent the blank a predetermined distance such that during the cutting stroke, it will cut only a portion of the way through the side wall thickness of the blank. The second knife will extend outwardly from that same holder a further distance and because it is in the same horizontal plane as the first blade, it will track through the cut line created by the first blade and because it extends a further distance out from the holder, it will complete the cut through the side wall thickness of rhe jar or container.

Because the first blade is set to only cut a portion of the way through the container's side wall, the sideways deflecting forces on the blade are equal. Accordingly, the line cut by that blade can be very straight. Because the second blade is passing through that cut line, it is, in effect, being guided thereby and also tends to produce a very straight secondary cut. While this second blade is set to completely sever through the side wall it still is cutting through a thickness substantially less than the thickness of the whole sidewall.

The apparatus also employs means for loading uncut blanks, for unloading cut blanks, means to securely clamp the uncut blank in place during cutting and control means to correctly control the automatic sequence of operations.

Although single razor blade slitting of thin films is known and practiced in the web handling art, cutting thick plastic moldings or extrusions, in the range of 0.030–0.300 inches, with razor blades has not been successful because of blade wander and breakage. The present invention overcomes these difficulties as described previously and in the following description of the preferred embodiment.

Other objects, features, and characteristics of the present invention as well as the methods and operation and functions of the related elements of the structure, and to the combination of parts and economies of manufacture, will become more apparent upon consideration of the following description and the appended claims with reference to the accompaying drawings, all of which form a part of this specification, wherein like reference numerals designate corresponding parts in the various figures.

BRIEF DESCRIPTION OF THE DRAWINGS

FIG. 3 is a diagrammatic end view of the apparatus shown in FIG. 1 with parts broken away for clarity;

FIG. 6 shows the power supply portion of the control circuit;

DETAILED DESCRIPTION OF THE PREFERRED EXEMPLARY EMBODIMENT OF THE PRESENT INVENTION

Figure 1:
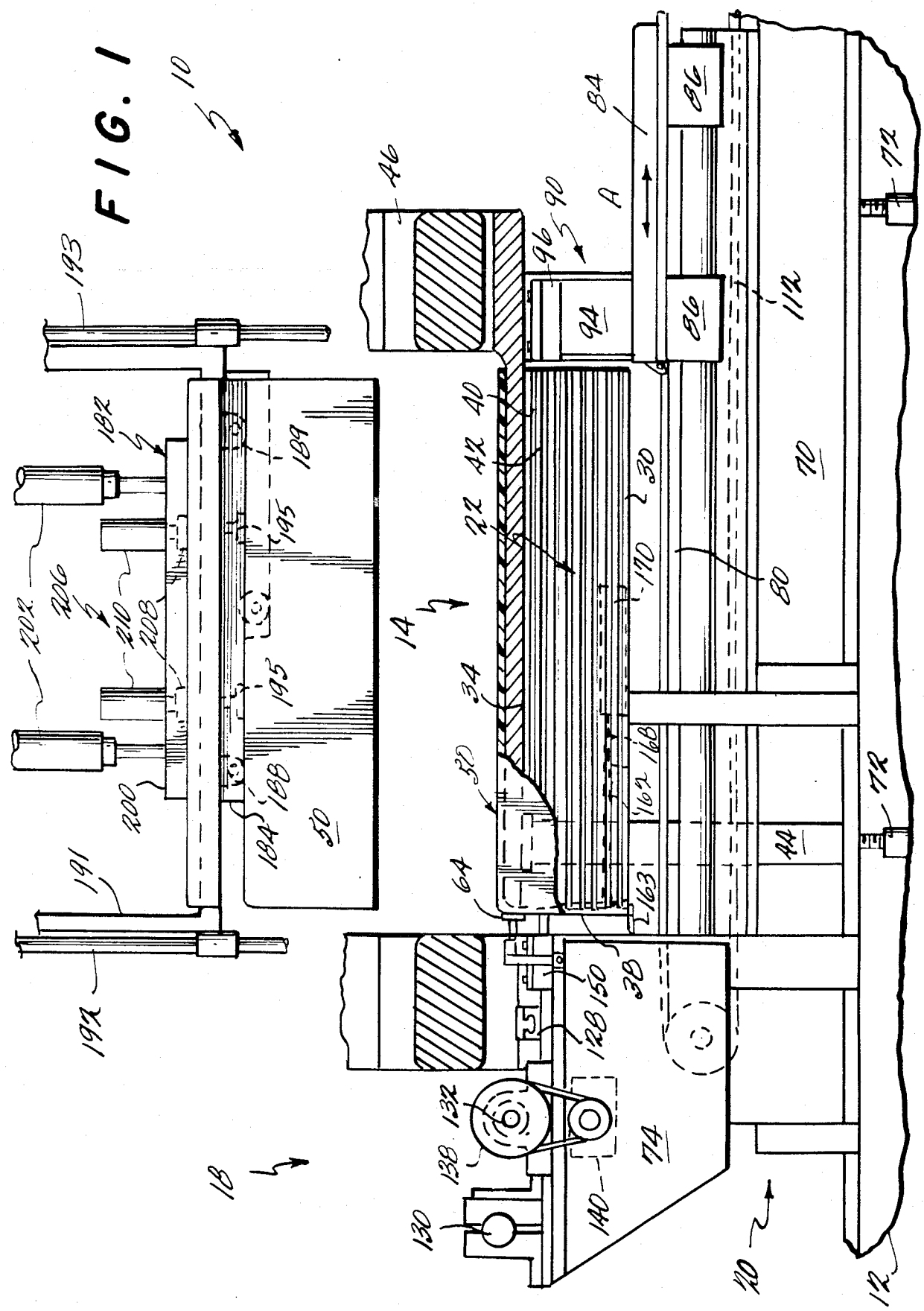
FIG. 1 is a diagrammatic, side elevational view of the preferred exemplary embodiment of the invention with parts broken away for clarity.
Figure 2:
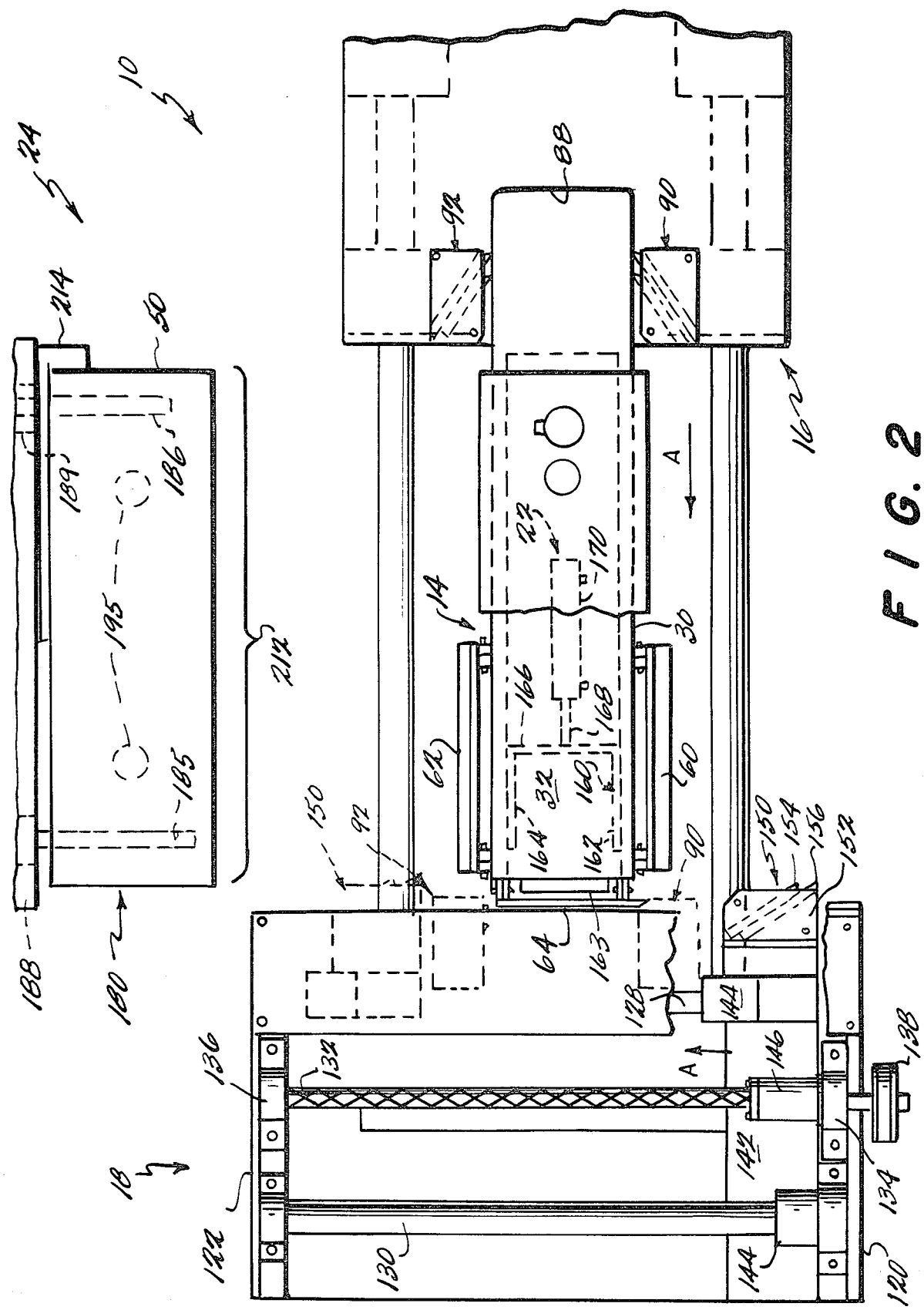
FIG. 2 is a diagrammatic, top plan view of the apparatus shown in FIG. 1 with parts again broken away for clarity.

Turning our attention first to FIGS. 1-3, the present invention, generally indicated at 10, is comprised of main frame 12 to which a plurality of sub-assemblies are connected. These sub-assemblies include a support assembly, generally indicated at 14, a side cutting assembly 16, an end cutting assembly 18, a cutting height adjusting assembly 20, a waste ejection assembly 22, loading and unloading assemblies, generally indicated at 24, and a programmable controller, generally indicated at 26.

The container support assembly 14 is comprised of a support tongue 30, comprised of a top wall 32, side walls 34 and 36, and a bottom or end wall 38. These four walls are held together by an internal frame work (not shown) in any convenient fashion so that a box structure having at least a top wall, two side walls and an end wall is formed thereby. Preferably, these walls are comprised of polypropylene sheets that are grooved as indicated at 40 so that the cutting knives as will be described later, will be able to pass through these grooves while cutting the container with ribs 42 acting together to define a support surface for the inside of the blank. It is necessary only that side walls 34 and 36 and end wall 38 be provided with this groove and rib structure, since it is contemplated with this particular embodiment to cut only the bottom and side walls of each blank. However, it should be understood that each of the walls along which cutting is to be done could be provided with this groove and rib structure.

As shown in FIG. 1, tongue 30 is supported at one end by column 44 which extends downwardly away from tongue 30, at the end toward end cutting assembly 18, to main frame 12. The opposite end of tongue 30 is supported from the top by column 46 which extends upwardly away from tongue 30 to the top portion of main frame 12. By supporting tongue 30 in this fashion, the area beneath the major length of tongue 30 is free of any support devices. As will become clear hereinafter, this allows the side cutting assembly 16 to move thereunder.

Figure 5:
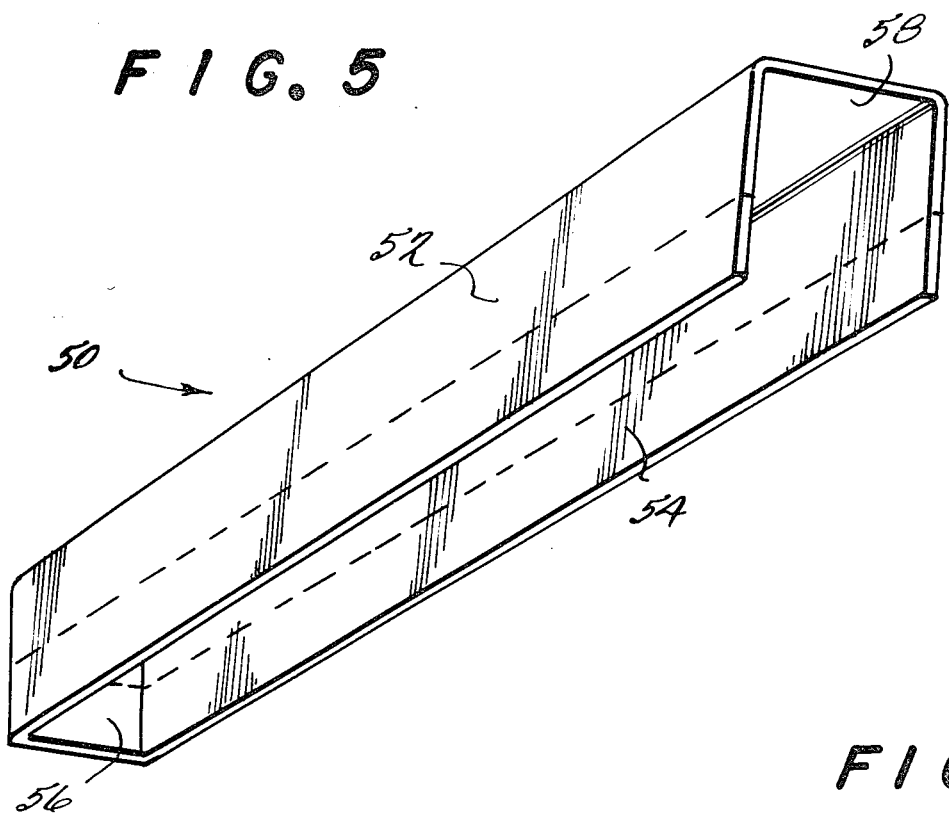
FIG. 5 a perspective view of an uncut blank showing the trim line in phantom.

As shown in FIG. 5, an uncut container or blank 50 is comprised of side walls 52 and 54, an end wall 56 and a top wall 58. This blank has a shape somewhat similar to that of tongue 30 and indeed, when blank 50 is placed on tongue 30, side walls 52 and 54 will straddle tongue side walls 34 and 36 of the tongue, end wall 56 will be adjacent tongue end wall 38 and top wall 58 will be adjacent tongue top wall 32. Also the proposed cut line is shown in phantom.

Side clamps 60 and 62, extend around the side cutting assembly 16 as shown in FIG. 2, and are attached to the bottom table and will be activated just prior to cutting in order to hold side walls 52 and 54 just above the cutting line firmly in position over tongue side walls 34 and 36. An end clamp 64 will perform a like function with respect to end wall 56 of the container 50 adjacent end wall 38 of the support tongue.

With reference to FIGS. 1 and 3, the height cutting adjustment assembly 20 is comprised primarily of a lower frame or table 70 adjustably supported on main frame 12 by means of a plurality of screw jacks 72.

Table 70 extends beneath tongue 30 and one portion of it extends outwardly past the end of tongue 30 adjacent column 44. Supported on that portion of table 70 which extends past that end of tongue 30, is an end frame 74 on which the end cutting assembly 18 is mounted; that end frame will be more fully described hereinafter.

Side cutting assembly 16 is supported on two rails 80 and 82 shown in FIGS. 1 and 3 and an upper support table or frame 84 is slidably connected to rails 80 and 82 by means of a plurality of slide bearings 86 mounted on each side of table 84.

As shown in FIG. 2, the front or lead end of table 84 that will move toward column 44 is provided with a knotched or slotted area 88 along its leading edge. Slot 88 is sized so as to be slightly larger than the width of column 44 and as side cutting assembly 16 moves along beneath tongue 30, table 84 will be able to pass around column 44.

Cutting units 90 and 92 are mounted to table 84 adjacent that front or leading edge and on each side of slot 88. Thus, as table 84 moves past column 44, slot 88 will allow cutting units 90 and 92 to pass beyond end wall 38 of tongue 30 to assure full and complete cutting of the entire length of the side walls 52 and 54 of the blank.

Figure 4:
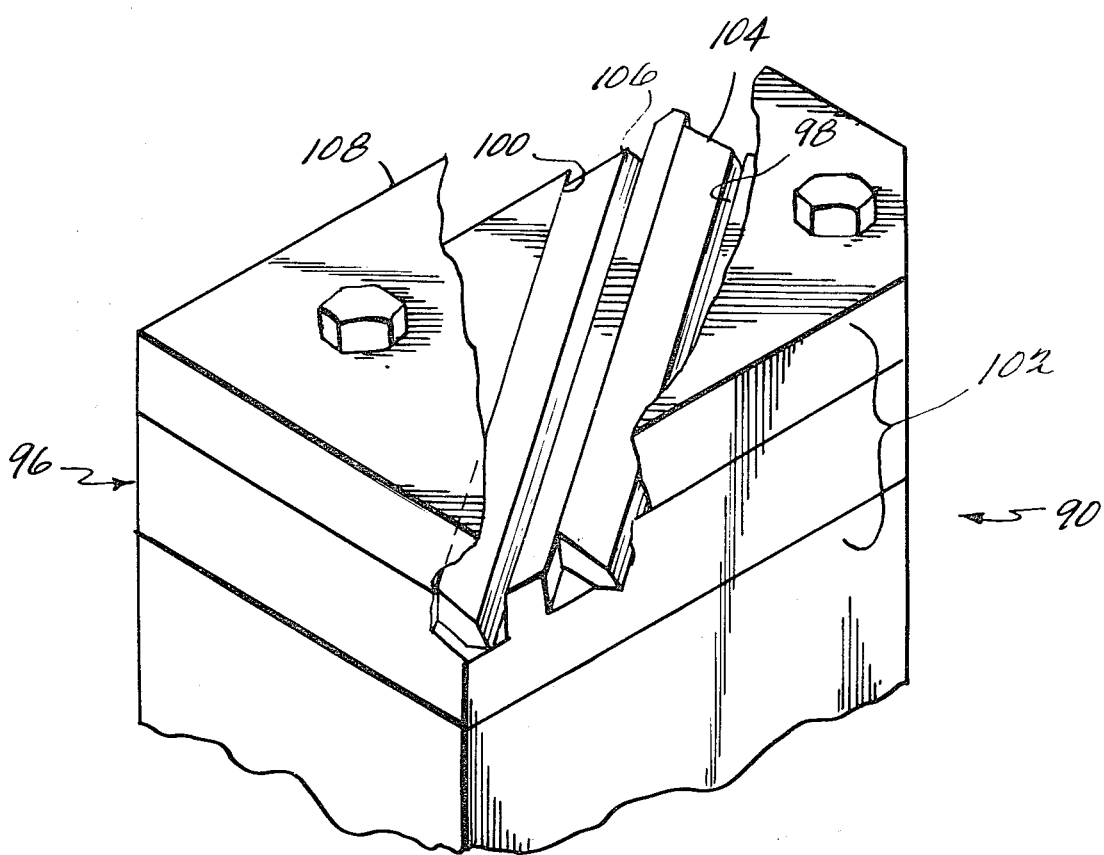
FIG. 4 is a perspective view of the cutter unit.

A more detailed view of cutting unit 90 is shown in FIG. 4 and cutting unit 92 is formed in a similar way. With reference specifically to FIG. 4, each cutting unit is comprised of a support base 94 which is secured by any convenient means to upper table 84 as for example, by screws (not shown). Secured to support base 94 is a support block 96 which is provided with two milled slots 98 and 100 that are angled with respect to the front face 102 of the cutting unit. It should be under stood also that front face 102 is that face of each cutting unit which is positioned closest to side walls 52 and 54 of blank 50.

Each of the milled slots 98 and 100 receives a knife blade, 104 and 106 respectively, which are held within slots 98 and 100 by top plate 108. It will be noticed from FIG. 2 that cutting units 90 and 92 are moved in a cutting stroke in the direction indicated by arrow A.

Knife blades 104 and 106 are positioned on support block 96, and slots 98 and 100 are milled so that both blades lie in the same plane. Lead knife 104 extends outwardly from front face 102 a first predetermined distance that will enable it to cut only a partial way through the side wall during the cutting stroke. Preferably, where the side wall of the blank, which can vary from about 0.030 to about 0.300 inches, is about 0.100 inches thick, knife 104 will make a cut ranging from about 0.020 to about 0.040 inches although variations from that could be allowed. The following or trailing knife 106 extends outwardly from face 102 a second predetermined distance, that will enable it to complete the cut through the wall. Thus, in the above example, the trailing blade would extend at least 0.060 inches and preferably about 0.100 inches beyond the first blade. It should be understood, however, that because the first blade only cuts a shallow groove and preferably has an edge that is sharpened from each side, it experiences equal forces from each side and, therefore, travels in a straight line. The second blade does not experience equal side forces as the scrap piece can move away, while the rest of the trimmed blank is clamped in position on the tongue. However, the cut line formed by the first blade, together with the angle of the second blade, result in guiding forces on the second blade which are much larger than the unbalanced forces. The second blade is, therefore, constrained to follow the straight line produced by the first blade. Thus, the apparatus can use a razor blade to cut relatively thick plastic material without wander or breakage.

End cutting assembly 18 is supported in support frame 74 which, as indicated previously, is connected to lower table 70. Support frame 74 is primarily comprised of two vertical wall members 120 and 122 and angle support brackets 124 and 126 which connect to table 70. Extending across vertical members 120 and 122 is a front guide rail 128 and a rear guide rail 130. In addition, a double helix cam drive shaft 132 is supported in bearings 134 and 136 while its outer drive end is connected to drive pulley 138, which in turn is connected by suitable drive means to motor 140. A drive carriage, generally indicated at 142, is supported by the front and rear guide rails 128 and 130 by suitable slide bearings, such as indicated at 144, and a drive coupling 146 depends from carriage 142 so as to drivingly engage the double helix cam drive shaft 132. Thus, as drive shaft 132 is rotated by motor 140, carriage 142 will traverse back and forth between vertical wall members 120 and 122.

Attached to the front of carriage 142 adjacent end 38 of tongue 30 is a cutting unit, generally indicated at 150, which is constructed in a manner similar to cutting unit 90 as shown in FIG. 4. As shown in FIG. 2, cutting unit 150 includes a top holding plate 152 which secures cutting knives 154 and 156 in their correct position. Here again, it should be understood that the lead knife 154 extends away from the front face 155 of cutting unit 150 a lesser distance than does the second knife 156. Thus, as carriage 142 moves across the end of tongue 30, knives 154 and 156 will engage end wall 56 of the uncut blank with knife 154 cutting part way through the end wall's thickness. Knife 156 follows along the cut line made by knife 154 and completes the cut through the end wall's thickness.

As will be appreciated it is necessary to have the sequence of cutting units 90, 92 and 150 work together in a synchronized manner, while the respective drives can be actuated at the same time, end outting unit 150 has a smaller surface to traverse and will complete its cut arriving at its end of cut position, as shown in phantom in FIG. 2 first. Cutting unit 150 will be held at that point to allow cutting units 90 and 92 to complete their traverse of the sidewalls. That position is also indicated in phantom in FIG. 2. Following ejection of the waste portion that has at this point been cut away (that portion below the cut line shown in FIG. 5) and the lifting of the trimmed blank away from tongue 30, each of the cutters 90, 92 and 150 will be returned to their initial start positions, as shown in full line in FIG. 2.

While the drive unit for the side cutting assembly 16 can be any of a variety of types, including long stroke drive cylinders, one way to accomplish the movement of cutters 90 and 92 is by means of hydraulic motor 110 which in turn drives a pair of drive belts 112 arranged about a pair of front pulleys 114 located beneath end cutting assembly 18 and a rear pair of pulleys (not shown) arranged so as to be axially aligned with and carried by drive shaft 118 of motor 110 secured to bottom table 70 and located at a convenient point at the rear of tongue 30. Pulleys 114 are mounted on a shaft rotatably mounted on brackets (not shown) which are secured to table 70 so that pulleys 114 are inboard of rails 80 and 82. Drive belts 112 extend around their respective front and rear pulleys and each is connected to the bottom of upper support table 84. Accordingly, when motor 110 is driven in a foward mode, table 84 will be moved in the direction indicated by arrow A. By reversing the drive direction of motor 110, upper table 84 will be moved rearwardly back to its initial starting position shown in FIG. 2.

Looking first at FIGS. 1 and 2, the waste or scrap ejection assembly 22 for ejecting the waste portion below the cut line operates internally within tongue 30 and is comprised of a U-shaped ejector having ejection legs 162 and 164 which are connected together by a rear connecting link 166. Ejector legs 162 and 164 preferably operate in a suitable slide or track. Plate 163 is mounted at the ends of ejector legs 162 and 164 at the bottom and extends beyond end 38 to receive the waste portion of the bottom wall when it falls following completion of the cutting strokes. Plate 163 is, accordingly, positioned lower than the longest side or end wall will reach. As shown in FIG. 3, ejector legs 162 and 164 are dimensioned so that they can slide through an opening that has been left between each side plate 34 and 36 and end plate 38. A drive cylinder 170 suitably supported within tongue 30 is connected to connecting link 166 through its drive shaft 168 and during the ejection stroke, cylinder 170 will be actuated forcing the U-shaped ejector forward so that legs 162 and 164 extend beyond end wall 38 of tongue 30. The stroke of cylinder 170 is preferably quick so that following cutting and after the scrap piece has dropped with the bottom section resting on the extension of plate 163 forward of column 44 and the side portions resting on upper table 84, the scrap portion below the cut line will be ejected out of the machine beneath end cutting assembly 18.

Turning now to FIGS. 1 and 3, the loading and unloading assembly 24 is comprised of an infeed loader, generally indicated at 180, and a clamp head generally indicated at 182. Turning first to the infeed loader, its function is to receive and pick up an uncut blank from a conveyor or a loading point where an uncut blank has been positioned, and to move that uncut blank directly over tongue 30 and lower it into position thereon. Infeed loader 180 is comprised of a vacuum pick-up assembly 184 which is horizontally movable on cantilever arms 185 and 186 which are driven by a drive cylinder 187. Arms 185 and 186 slide in bearings 188 and 189 mounted beneath the outfeed deck 190. Also secured to deck 190 is a vertical frame 191 which is slidably connected to vertical rails 192 and 193 secured to main frame 12. Frame 191 moves vertically under the vertical control of drive cylinder 194 mounted between the main frame 12 and vertical frame 191. Located within vacuum pick-up assembly 184 is a vacuum cup assembly shown in phantom at 195 which includes vacuum cups which move with assembly 184. This vacuum pick-up assembly 184 moves vertically up and down by moving with frame 191 by the action of drive cylinder 194.

Thus, the vacuum pick-up assembly depends upon vertical frame 191 and drive cylinder 194 for its vertical movement but moves horizontally independently of vertical frame 191. Its horizontal movement begins at a pick-up position, as shown in full line in FIG. 3, and ends at a forward position, as shown in phantom. In this latter position, uncut blank 50 is directly over tongue 30 and when cylinder 194 is actuated, blank 50 will be lowered into place over tongue 30. When the vacuum securing uncut blank 50 to assembly 184 is released the uncut blank will remain in position on tongue 30. When assembly 184 is thereafter raised back to its "up" position, clamp head 182 will be able to deposit a cut blank, which it had previously removed from tongue 30 as it was raised, on top of assembly 184. While this will be described below, assembly 184 with a cut blank on its upper surface can be retracted to its start (full line) position. When it arrives at that point it will be stopped suddenly and the cut blank will slide through the opening within vertical frame 191 and onto the outfeed or unloading deck 190 from which it can be manually removed.

Turning now to clamp head 182, it is comprised of an outer frame 200, which is vertically movable within the main frame 12 by being connected to cylinders 202 via drive shafts 204; cylinders 202 are connected to an upper portion of main frame 12. Located within frame 200 is another vacuum pickup assembly 206 which includes vertically movable vacuum cups 208 connected to drive cylinders 210.

Thus, at the beginning of operation, an uncut blank is suitably positioned in a pickup area outboard of the machine and generally shown at 212. Vacuum pick-up assembly 180 is lowered until cup assembly 195 comes into engagement with the upper surface of blank 50 and vacuum is applied. The cylinder rod of cylinder 194 will be retracted and vertical frame 191 together with vacuum pick-up assembly 184 will be lifted to an "up" position. Thereafter, frame 184 will be moved by cylinder 187 into a position immediately overlying tongue 30. At that point, cylinder 194 will lower assembly 184 thereby lowering blank 50 on tongue 30 and when vacuum is released blank 50 will rest on tongue 30. If this is the first blank coming into the machine, no blank will have been previously unloaded. Assembly 184 will then be retracted to its outboard position ready to pick up another blank. Clamp head 182 will be lowered so that frame 200 engages the top of wall 58 thereby placing vertical pressure on the uncut blank. Thereafter, side clamps 60 and 62 as well as end clamp 64 will be actuated. End cutting assembly 18 will complete its cut first and will be held in its "end of cut" position while side cutting assembly 16 completes its cut. At that point cutting units 90 and 92 will lie approximately in the path of end cutting unit 152 as shown in phantom in FIG. 2.

Thereafter side and end clamps 60, 62, and 64, respectively, will open and vacuum will be applied to vacuum cups 208 within frame 200 of clamping head 182. Thus, when clamping head 182 is raised by cylinders 202, it will lift the cut portion of blank 50 upwardly off of tongue 30 and above the horizontal path of assembly 184. Following removal of the trimmed blank from the tongue, ejection cyclinder 170 will be actuated so that the scrap portion of the end and side walls will be ejected out of the machine beneath end cutting assembly 18. The cut blank will be held in that raised position and another blank will be fed between clamping head 182 and tongue 30 and lowered into position as previously described. Following that vacuum cups 208 will be lowered thereby lowering the cut portion of the container, that had been held by clamp head 182, to the upper surface of assembly frame 184. When the cut portion is positioned thereon, vacuum will be removed from vacuum cups 208. Vacuum cups 208 will thereafter be retracted within frame 200 and assembly 184 will retract to its pickup position where the cut blank will be deposited on deck 190 and unloaded. This cycle will continue as long as uncut blanks are made available to the infeed assmebly 180.

Turning now to the control system and specifically to FIGS. 6-9, FIG. 9 is a flow diagram which covers the various procedural steps through which the apparatus is operated in order to complete the loading and unloading of the blanks as well as the appropriate cutting of uncut blanks to a predetermined size. Initially, blanks can be manually placed against a stop, such as at 214 in FIGS. 2 and 3, which determines a loading position. While it is not shown in the present invention, uncut blanks could be fed to that point by means of a conveying system. However, regardless of how it occurs, an uncut blank will arrive at its initial pickup position. The vacuum pick-up assembly 184 will descend and with vacuum applied to vacuum cups the blank will be secured and rise together with the vacuum pick-up assembly itself as it is raised to a position where it can be horizontally fed into the machine. The vacuum pick-up assembly is then moved horizontally so that the uncut blank is positioned over tongue 30 and assembly 184 will again descend so that the blank is placed on tongue 30 at which point vacuum is cut off. Assembly 184 will then rise and assuming that no blank had been cut previously, no cut blank will be held by the clamp head and assembly 184 will be retracted. Clamp head 182 can then descend to firmly clamp the uncut blank on tongue 30. Following actuation of the end and side clamps, the side and end wall cuts will be made. Following cutting, the side and end clamps will be opened releasing the cut portion. Vacuum will be applied to the vacuum cups in the clamp head so that the cut blank will be secured to it so that when clamp head 182 is raised the cut blank will be raised with it and removed from tongue 30. As the head is being raised, the scrap piece below the cut line will be ejected to clear the machine and both sets of cutters return to their initial position. At the same time, infeed loading can begin again to prepare another uncut blank for horizontal feeding into the apparatus. Thus, when clamp head 182 is in its fully raised position, having removed the cut blank from tongue 30 and raised it above the level of infeed for the vacuum pick-up assembly 184 that assembly can then move another uncut blank into the machine and lower it onto tongue 30. With the vacuum pick-up assembly 184 back in its horizontal infeed position, it will be held at that position, at least momentarily, while clamp head 182, and specifically the vacuum assembly 206, lowers the cut blank onto the top of the vacuum pick-up assembly 184. Vacuum will be removed from vacuum cups 208 and vacuum assembly 206 will be indexed upwardly back into the frame of clamp head 182. Thereafter, vacuum pick-up assembly 184 can retract horizontally out of the machine where the cut blank can be unloaded.

Turning next to FIG. 6, the power circuit is set forth and begins with a 220 volt 3-phase 60 hertz power supply that comes into lines L1–L3 through a main disconnect switch identified as 1-disc. Transformer 222, which supplies control power to the rest of the circuit, is connected across this 3-phase power supply as are a hydraulic pump motor 1MTK connected to 110 and 140 and the motor 220 which drives the vacuum pump used to provide vacuum to the vacuum pick-up assembly 184 and head clamp 182.

Figure 7:
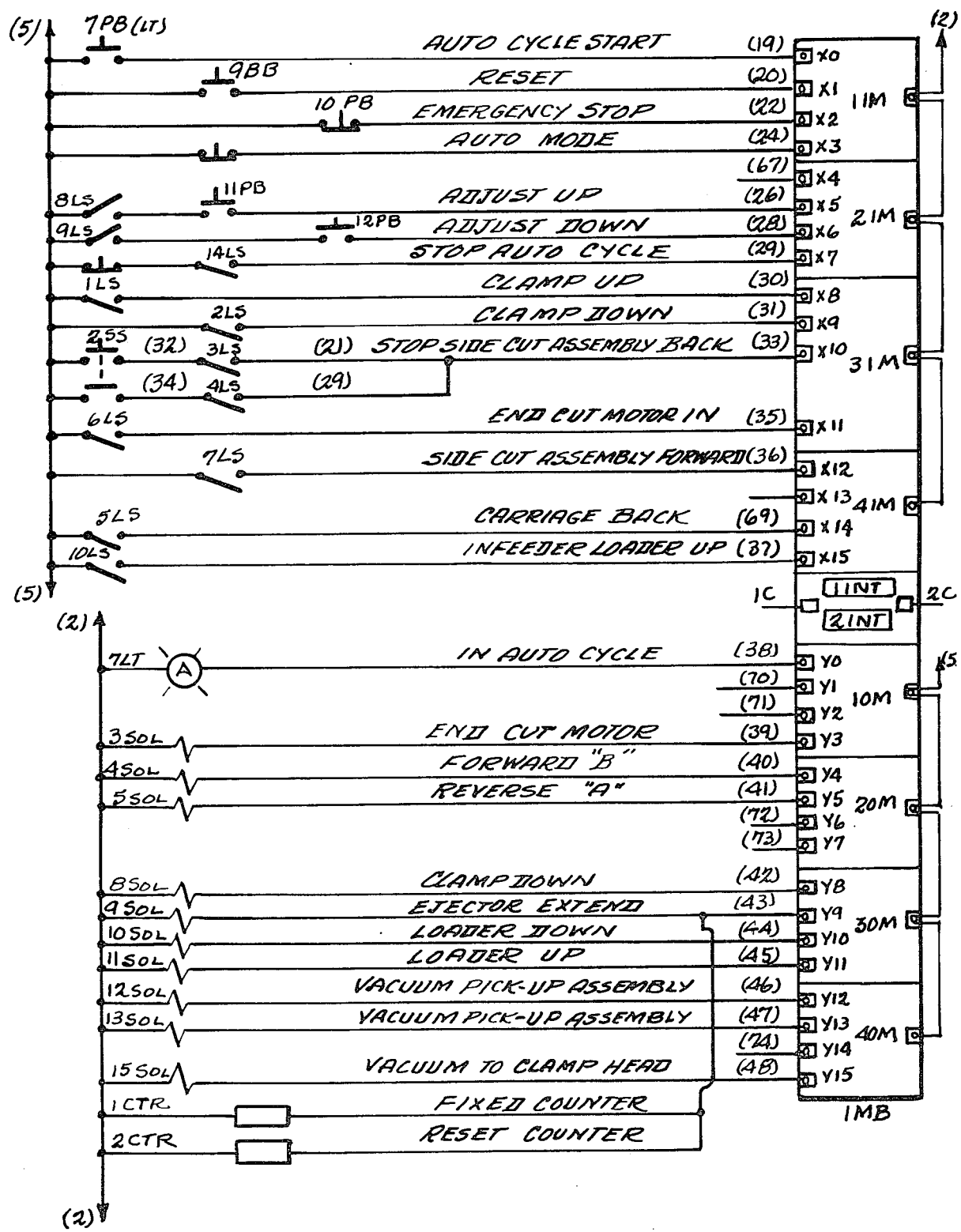
FIGS. 7 and 8 show the input and output panel board connections used in the control circuit.
Figure 8:
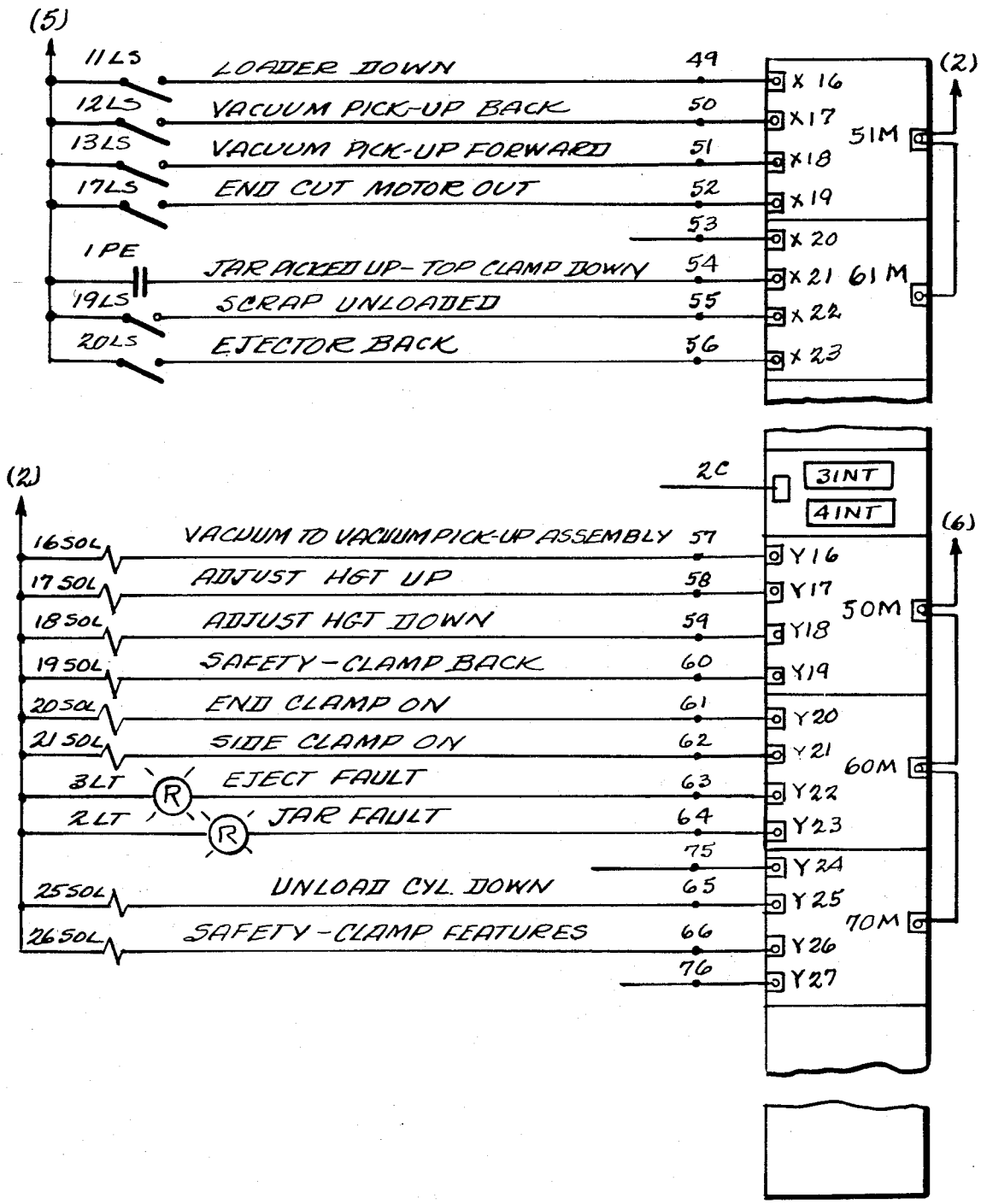
Figure 9:
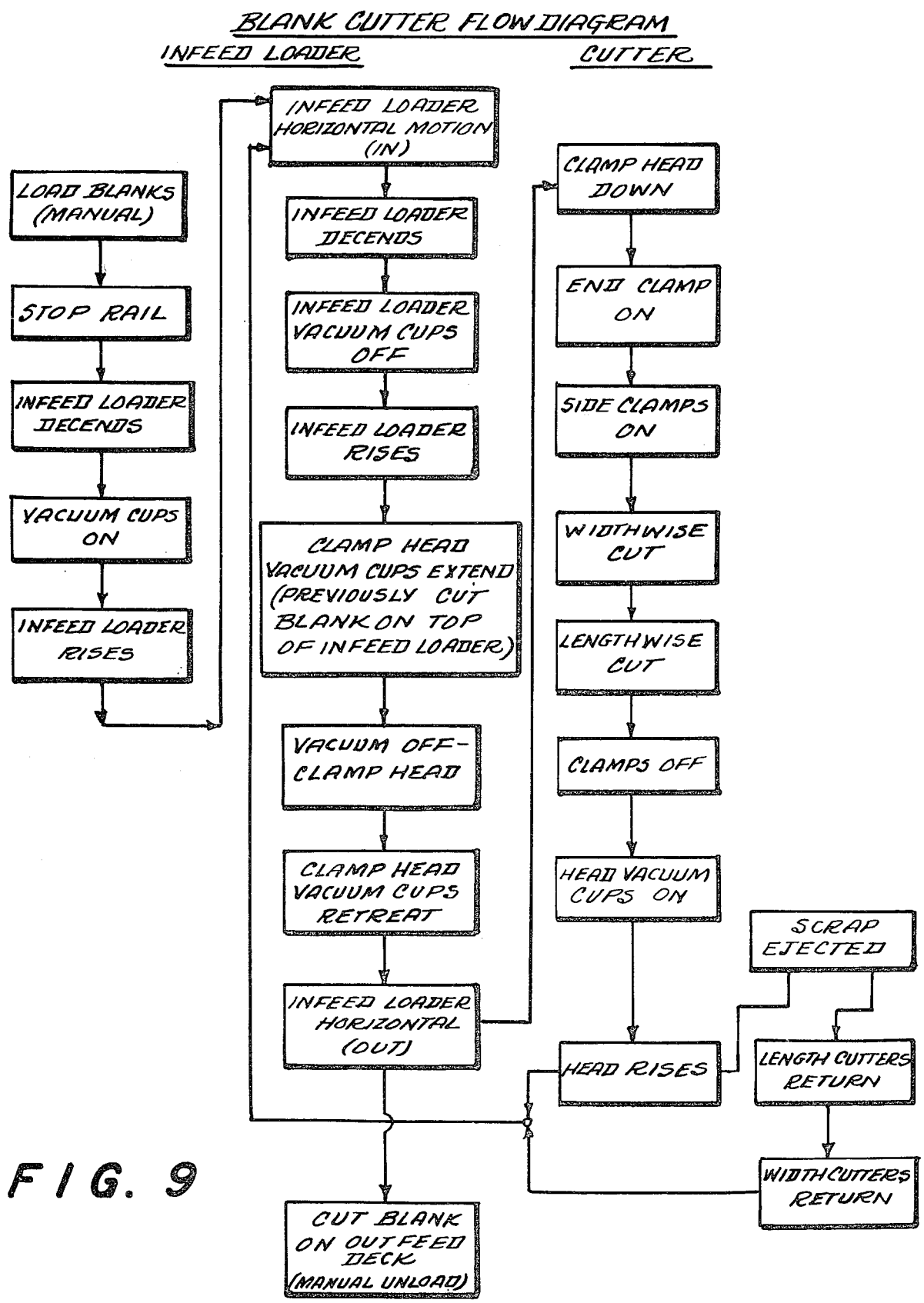
FIG. 9 shows the flow diagram for the operation of the apparatus.

The remainder of the circuit shown in FIG. 6, includes the power supply connections for the input/output panels, set forth in FIG. 7 and 8 through connections numbered (2), (5) and (6), and the initial start circuit. This includes the main start push button, identified as 1PB, which is latched closed, and two switches 224 and 226 for respectively opening a circuit if a repair door or a door that provides access to the vacuum pump filters is opened. Closing switch 1PB actuates the hydraulic pump motor and motor 220, identified respectively as 1M and 2M, together with the hour meter, and a hydraulic accumulator dump valve, which will dump hydraulic pressure when overload or emergency conditions exist. Also included in this turn-on circuit is a motor "on" light identified as 4LT. Additionally, a photoelectric eye 1PE is also included which is used to indicate that a cut blank has been removed from tongue 30, has been fully picked up by clamp head 182 and is in the correct position to be unloaded.

Turning now to the input/output panels shown in FIGS. 7 and 8, it should be understood that a number of limit switches are used throughout the apparatus to indicate that a particular portion of the apparatus has reached a given position so that the controller will know the program can be continued. While not all are shown it will be clear to one skilled in the art where they would be placed, for example, to sense the vertical positioning of vertical frame 191 the horizontal forward or back position of vacuum pick-up assembly 184 at the beginning or end of cut positions for the cutting units. In that regard, the controller being used in the present application is a model 5 Texas Instruments programmable control system which includes a programmer, sequencer and input/output boards which provide the necessary control logic interface between the operating solenoids of the pneumatic and hydraulic systems and various limit switches employed throughout the apparatus. Attached hereto as Attachment A is the program listing used in controlling this controller.

With respect to the input portion of these boards, input X4, X13 and X20 are spare positions while on the output side, positions Y1, Y2, Y6, Y7, Y24 and Y 27 are likewise spare positions and are not presently used.

With regard to the input positions, the input at X0 is from a momentary switch 7PB, located on a control panel (not shown), which starts the automatic cycle in its operation. Switch 8PB, at position X1, produces a reset signal which will be used to reset the automatic cycle back to its initial start position. The input at position X2 from push button 10PB is an emergency stop while the input at X3 indicates either automatic operation or a separate adjustment operation where the height of bottom table 70 be adjusted. The inputs at X5 and X6, from limit switches 8LS or 9LS respectively, will prevent the adjusting sequence from extending the jack screws either too high or too low and accordingly, when either is tripped automatic operation of the adjusting sequence portion of the program would be stopped to prevent damage to to that equipment.

The input from the automatic stop cycle position at X7 would indicate that a door adjacent the height adjustment area was opened which again would require the machine to be stopped to assure no injuries would occur.

Inputs at X8 and X9 relate to the positioning of head clamp 182, either in its raised or lowered condition, which is sensed by limit switches 1LS and 2LS, respectively. Inputs at X10 and X14 indicate that the side cutting assembly 16 has stopped at a predetermined point and depending upon the size of the jar or container being cut, that side cutting assembly 16 will stop in a position to cut a jar 21 inches, 29 inches or 36 inches in height, as controlled, respectively, by limit switches 3LS, 4LS or 5LS. With respect to the choice between 21 inches and 29 inches, looking specifically at the input at X10, this is determined by a two position switch 2SS and if neither of those are chosen, the side cutting assembly 16 will move to its full back position which will be sensed by limit switch 5LS thus producing a signal at position at X14. The input at position at X12 indicates that the side cutting assembly 16 has arrived in its forward most position, shown in phantom in FIG. 2, where it will be held momentarily.

The input at position X11 activated by light switch 6LS in FIG. 7, indicates that the end cutter has completed its cut, and the input at position X19 activated by limit switch 17LS in FIG. 8 indicates the end cutter 150 has been returned to the starting position.

The input at X15 in FIG. 7 and X16 in FIG. 8, relates to the position of vertical frame 191 as being in its raised and lowered position, as detected by limit switches 10LS and 11LS, respectively, while inputs at positions X17 and X18 relate to the horizontal positioning of the vacuum pick up assembly 184 and its positioning out of the machine, as indicated by limit switch 12LS and its position directly over tongue 30 as indicated by limit switch 13LS.

The input at position X21 is produced by the electric eye 1PE and indicates that the trimmed blank has been removed from the tongue 30. Inputs at the final positions at X22 and X23 relate to the ejection of the cut scrap portion. The input at position X22 is registered by limit switch 19LS which is tripped by the piece of scrap material as it is ejected; the input at position X23 is through the actuation of limit switch 20LS which is closed when ejector assembly 22 is back in its rearmost positon.

Turning now to the output portion of FIGS. 7 and 8, the output at position Y0 lights a light 7LT indicating the program is in its automatic cycle. The output at Y3 controls a solenoid for activating end cut motor 140 with outputs at Y4 and Y5 respectfully actuating hydraulic motor 110 to drive the upper plate 84 in its forward and reverse drive modes.

Cylinders 202 and 170 which respectively operate the clamp head and ejector assemblies, have spring returns and acordingly the output at positions Y8 and Y9 operate solenoid valves that respectively drive cyclinder 202 to lower clamp head 182 and cause the U-shaped ejector 160 to be extended. The output at Y9 also trips two counters, one providing a constantly updating total cut counter the other being resettable to count a run. The infeed loader or vertical frame 191 will be moved vertically down according to an output at Y10 while the vacuum pick-up assembly 184 will be driven so as to be extended into the device by cylinder 187 via the output at position Y12 in order to deposit an uncut blank on tongue 30 and to remove a previously cut blank whereas the output at Y13 will cause cylinder 187 to retract vacuum pick-up assembly 184.

The outputs at positions Y15 and Y16, respectively connect vacuum pump 220 to clamp head 182 and to the vacuum pick-up assembly 184 while outputs at Y17 or Y18 are used to adjust the jack screws 72 in order to raise or lower the bottom table 70.

In order to insure that clamp head 182 does not fall accidentally from its raised position, a safety locking pin arrangement, indicated generally at 224, is provided adjacent cylinder 202. This locking unit will be actuated by solenoids and will be moved rearwardly or out of engagement by the output at position Y19 prior to allowing clamp head 182 to descend and will be moved forwardly or back into locking engagement by the output at position Y26 in order to again lock clamp head 182 in its fully raised position.

Outputs at positions Y20 and Y21, respectively, actuate end clamp 64 and side clamps 60 and 62 and the output at Y25 will cause the vacuum assembly 206 to be lowered to deposit the cut blank on top of the vacuum pick-up assembly 184; vacuum assembly 206 in clamp head 182 has a spring return. Two fault signals indicated at Y22 and Y23 can also be employed to respectively light lamps 3LT and 2LT to show a fault situation which can result from leaving a blank on the tongue or not having the cutting stroke fully completed whereas an ejection fault can occur if there is no input signal indicated at X22 by limit switch 19LS.

Cutting moldings or extrusions by the present method requires that the material being cut be sufficiently compressible that the cutting blades may make spaces for themselves under low enough lateral normal forces that the blade material can withstand, without breakage, the frictional forces imposed on the moving blades by the normal forces. Although our present experience includes cutting impact grade polypropylene moldings made of Rexene 18W4 and 17S2, and Uniroyal high-impact grade acrylonitryl-butadiene-styrene resin, many other materials have properties which would allow them to be cut using the present invention.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation so as to encompass all such modifications and equivalent structures.

What we claim is:

1. Apparatus for trimming walls of plastic containers comprising:
   support means for supporting the container being trimmed, said support means including a support tongue having an outer shape comparable to the interior shape of the container;
   first cutting means for moving in a direction parallel to at least one wall and slicing through the thickness of said at least one wall while moving in said direction parallel thereto;
   second cutting means for moving in a direction parallel to at least one other wall normal to said at least one wall and slicing through the thickness of said at least one other wall while moving in said direction parallel thereto;
   drive means for driving each of said first and second cutting means; and
   control means for controlling the cutting sequence of said first and second cutting means.

2. Apparatus as in claim 1 wherein said support tongue is comprised of an end wall, first and second side walls and a top wall which are joined together.

3. Apparatus as in claim 2 wherein the end and side walls are grooved.

4. Apparatus as in claim 1 wherein said support means includes ejection means for ejecting the scrap portion following cutting.

5. Apparatus as in claim 1 wherein said first cutting means is positioned to cut across the end of said support means, said support means has at least one end and side, and said second cutting means being positioned to cut along the side of said support means.

6. Apparatus for trimming walls of plastic containers comprising:
   support means for supporting the container being trimmed;
   first cutting means for moving in a direction parallel to at least one wall and slicing through the thickness of said at least one wall while moving in said direction parallel thereto;
   said first cutting means including support means for supporting at least two cutting blades in a common plane so that each of said at least two cutting blades cuts along the same path;
   second cutting means for moving in a direction parallel to at least one other wall normal to said at least one wall and slicing through the thickness of said at least one other wall while moving in said direction parallel thereto;
   drive means for driving each of said first and second cutting means; and
   control means for controlling the cutting sequence of said first and second cutting means.

7. Apparatus as in claim 6 wherein one of said cutting blades moves first along said cut path and is positioned so that it cuts only a partial distance through the container wall, the other of said cutting blades following along said cut path so that the cut made by said one cutting blade, guides said other cutting blade, said other cutting blade being positioned so that it cuts the remaining wall thickness along said cut path.

8. Apparatus for trimming walls of plastic containers comprising:
   support means for supporting the container being trimmed;
   first cutting means for moving in a direction parallel to at least one wall and slicing through the thickness of said at least one wall while moving in said direction parallel thereto;
   second cutting means for moving in a direction parallel to at least one other wall normal to said at least one wall and slicing through the thickness of said at least one other wall while moving in said direction parallel thereto;
   said second cutting means including support means for supporting at least two cutting blades in a common plane so that each of said at least two cutting blades cuts along the same path;
   drive means for driving each of said first and second cutting means; and
   control means for controlling the cutting sequence of said first and second cutting means.

9. Apparatus as in claim 8 wherein one of said cutting blades moves first along said cut path and is positioned so that it cuts only a partial distance through the container wall, the other of said cutting blades following along said cut path so that the cut made by said one cutting blade being positioned so that it cuts the remaining wall thickness along said cut path.

10. Apparatus for trimming walls of plastic containers comprising:
    support means for supporting the container being trimmed;
    first cutting means for moving in a direction parallel to at least one wall and slicing through the thickness of said at least one wall while moving in said direction parallel thereto;

second cutting means for moving in a direction parallel to at least one other wall normal to said at least one wall and slicing through the thickness of said at least one other wall while moving in said direction parallel thereto;

each of said first and second cutting means includes two cutting blades positioned in the same plane, one of said cutting blades extending outwardly from said cutting means a first predetermined distance so that it forms a cut line, along the wall being cut, having a depth equal to only part of the wall thickness, the other of said cutting blades extending outwardly from said cutting means a second predetermined distance so that it follows in the cut line produced by said one cutting blade and completes the cutting of the wall;

drive means for driving each of said first and second cutting means; and control means for controlling the cutting sequence of said first and second cutting means.

11. Apparatus as in claim 10 wherein said second predetermined distance is greater than said first predetermined distance.

12. Apparatus as in any one of claim 7, 9 or 10 wherein said one cutting blade cuts less than half the thickness of the wall being cut.

13. Apparatus as in any one of the claims 7, 9 or 10 wherein said one cutting blade forms a cut having a depth of about 25 percent to about 60 percent of the thickness of the wall being cut.

14. Apparatus for trimming walls of plastic containers comprising:

support means for supporting the container being trimmed;

first cutting means for moving in a direction parallel to at least one wall and slicing through the thickness of said at least one wall while moving in said direction parallel thereto;

second cutting means for moving in a direction parallel to at least one other wall normal to said at least one wall and slicing through the thickness of said at least one other wall while moving in said direction parallel thereto;

said first cutting means includes at least one cutting unit having a support block having a front face directed toward said at least one wall and first and second slots provided therein at an angle to said front face, first and second cutting blades respectively positioned within said first and second slots and holding means for holding said first and second cutting blades in said first cutting means;

drive means for driving each of said first and second cutting means; and control means for controlling the cutting sequence of said first and second cutting means.

15. Apparatus as in claim 14 wherein said second cutting means includes at least one cutting unit having a support block having a front face directed toward said at least one wall and first and second slots provided therein at an angle to said front face, first and second cutting blades respectively positioned within said first and second slots and holding means for holding said first and second cutting blades in said first cutting means.

16. Apparatus as in either claim 14 or 16 wherein said first and second cutting blades lie in the same plane and wherein said first cutting blade cuts in advance of said second cutting blade, said first cutting blade extending outwardly from said front face a first predetermined distance and said second cutting blade extending outwardly from said front face a second predetermined distance which is greater than said first predetermined distance so that said first blade cuts part way through the wall while said second blade cuts through the wall.

17. Apparatus as in claim 16 wherein said second cutting means includes two cutting units positioned on opposite sides of said support means.

* * * * *